Oct. 15, 1946.　　　　B. W. JONES　　　　2,409,492
THERMAL TIME SEQUENCING CONTROL SYSTEM
Filed March 7, 1944
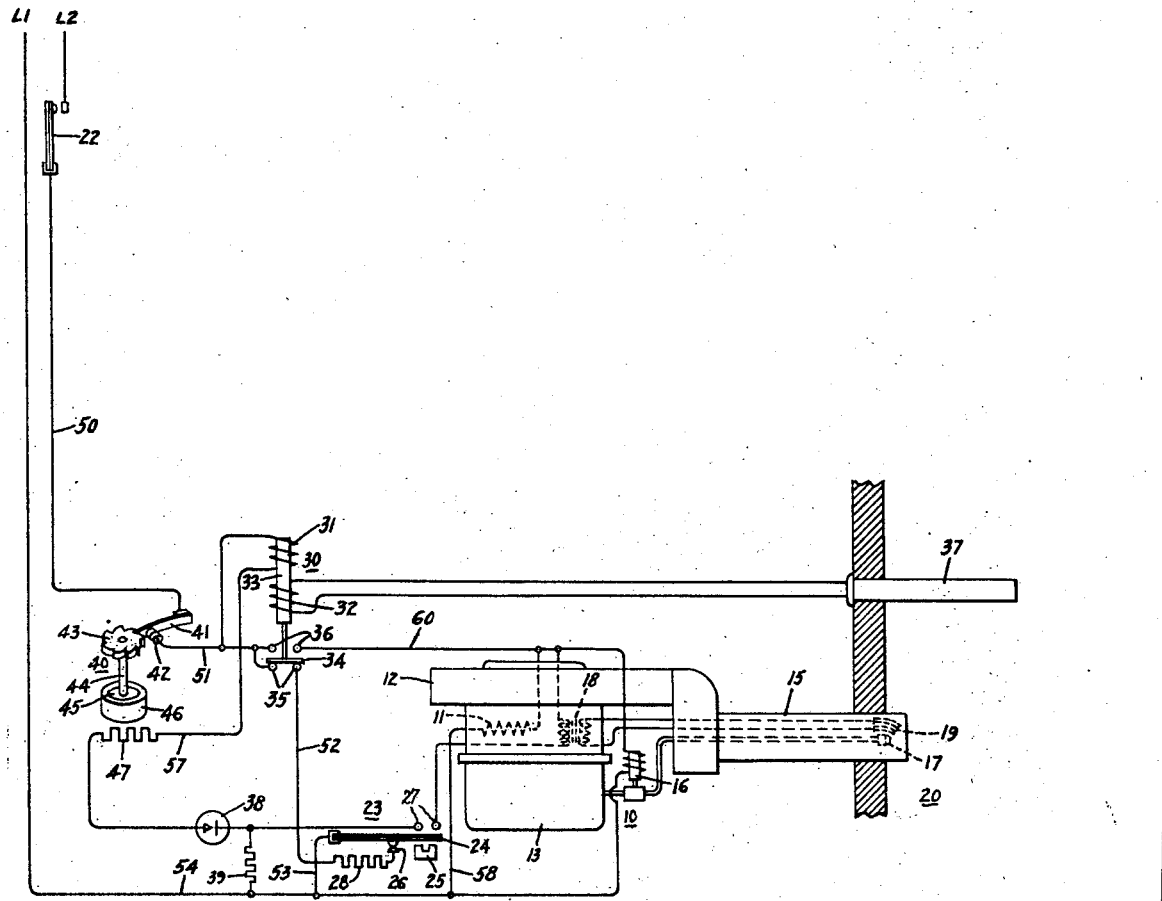
Inventor:
Benjamin W. Jones,
by Harry E. Dunham
His Attorney.

Patented Oct. 15, 1946

2,409,492

UNITED STATES PATENT OFFICE 2,409,492

THERMAL TIME SEQUENCING CONTROL SYSTEM

Benjamin W. Jones, Schenectady, N. Y., assignor to General Electric Company, a corporation of New York Application March 7, 1944, Serial No. 525,445

20 Claims. (Cl. 158—28)

The invention relates to control systems, particularly sequencing control systems for operating oil burners or other condition regulating devices requiring a sequential time and condition responsive operation control.

One of the objects is to provide an improved thermal time sequencing control system that is capable of providing repeated timed starting operations of a burner or other device during a limited cooling period under the automatic control of a master controller responsive to a predetermined condition, such as temperature, pressure or the like, and of automatically continuing operation of the device only in case a resultant operating condition, such as combustion or the like, is successfully established during one of the limited cooling timed starting operations.

A particular object is to provide an improved time and condition responsive sequencing control system utilizing only the initial part of the cooling time delay of an electrically heated thermal timer to insure more accurate timing of each trial operation interval since such cooling time is not only independent of variable voltage conditions but also is influenced the least by any normal ambient temperature variation.

Another object is to provide an improved sequencing control system wherein repeated periodic operations of a thermal timer alternately energize a timer heater and an electroresponsive operation control device in such a way as to maintain the control device energized only during the initial part of the cooling period of the thermal timer and to maintain both the heater and the control device deenergized during the subsequent part of the cooling period, and wherein a separate thermal lockout timer having a relatively long time delay produces a safety lockout only in case a predetermined condition is not established during a limited number of repeated timed energizations of the operation control device.

A further object is to provide an electroresponsive control device having an incremental pickup energization and an incremental holding energization with a thermal timer for limting the incremental pickup energization period thereof and with an improved condition responsive energizing means for providing the incremental holding energization therefor independently of the thermal timer when a predetermined condition is successfully established during the limited pickup period of energization of the device.

A more specific object is to provide an improved sequential control system having a unidirectional current responsive operation control relay provided with magnetically interrelated pickup and holding windings and having the pickup winding only partially energized under the control of a master switch and then effectively energized under the control of a thermal timer only for a limited initial period during the cooling time delay thereof, and having the relay holding winding then energized in response to the occurrence of a predetermined condition during the limited effective pickup energizing period of the pickup winding to supplement the partial energization of the pickup winding that is controlled by the master switch. Such improved sequential relay energization control system is of particular advantage for operating a burner since it enables a thermal responsive control device that is heated upon the successful establishment of combustion by the burner, such, for example, as a thermoelectric generator, to energize the holding winding of the operation control relay and thereby continue operation of the burner under the joint control of the master switch and the thermoelectric generator after the operation control relay has been temporarily picked up during the initial part of the cooling period of the thermal timer.

Further objects and advantages of the present invention will appear in the following description of the accompanying drawing in which the single figure is a schematic circuit diagram of an automatic oil burner sequential control system embodying the improvements of the present invention in a preferred form.

The oil burner 10 may be of any usual type having a driving motor, indicated schematically by the motor energizing winding 11, for operating a blower 12 and an oil pump 13. The blower 12 supplies air under pressure to the nozzle air tube 15 and the oil pump 13 supplies oil under pressure, when the electromagnetic oil flow control valve 16 is energized, to the oil atomizing nozzle 17. An ignition transformer 18 produces an ignition arc between the electrodes 19 to ignite the atomized oil projected from the nozzle 17 and thereby establish combustion in the combustion chamber 20 of a furnace or other heating device. Operation of the oil burner 10 is always under the control of a master control switch 22 which may be responsive to a condition dependent upon the operation of the burner 10, such as room temperature or the like.

In accordance with the present invention, the room thermostat 22 operates first to provide a partial energization of the electroresponsive burner control relay 30 and then, through the agency of the periodic thermal timer 23, temporarily provides an effective pickup energization of relay 30 to start operation of the oil burner 10 and continue such operation only for a limited initial period during the cooling of the thermal timer 23 in case combustion is not established.

A shown, the thermal timer 23 is provided with a thermal responsive operation control member 24 of the bimetal type which is normally biased when cool into attracted relation with the snap action permanent magnet 25 so as to maintain the timing heater circuit control contacts 26 firmly in engagement during the predetermined period of heating of the bimetal member 24 required to release the member 24 from the magnet and thermally bias member 24 to close the alternative circuit controlling contacts 27. The thermal timing element 24 operates with a snap action to open the contacts 26 and close the two contacts 27 after the electric heater 28 is energized to provide a limited period of heating of the thermal timing element 24. Since the thermal timing element 24 effects the deenergization of the timer heater 28 by means of contacts 26, the two contacts 27 can be maintained closed only during a predetermined initial part of the cooling period of the thermal responsive element 24 as predetermined by the snap action produced by magnet 25 in opening contacts 26 and closing contacts 27. As a result, both contacts 26 and contacts 27 are maintained opened during the subsequent cooling of the thermal timing member 24. When cool, member 24 then returns into attractive relation with magnet 25 and recloses contacts 26. Thus the thermal timer 23 constitutes a periodic alternative circuit controlling double throw switch having a snap action magnet for extending the heating period thereof and providing a unilateral thermal time delay movement after an initial limited period of cooling.

The electroresponsive control relay 30 is shown as of a special double winding type, having a pickup winding 31 and a holding winding 32, both in magnetic attractive relation with the switch operating plunger 33. The plunger 33 is biased to operate the movable switch contact 34 into engagement with the lower cooperating contacts 35. Only when the pickup winding 31 is effectively energized can plunger 33 operate contact 34 into engagement with the upper contacts 36. But the holding winding 32 can thereupon become effective to attract the plunger 33 with a force tending to hold contact 34 in engagement with contacts 36. As shown, the relay holding winding 32 is connected to be energized directly from a suitable thermoelectric generator 37 located in the combustion chamber 20 so as to be responsive to the establishment of combustion therein due to operation of the oil burner 10.

The thermoelectric generator 37 inherently generates a relatively feeble unidirectional current. Consequently, the energization of relay 30 must be specially controlled so that the feeble unidirectional energization of holding winding 32 from generator 37 resulting from the establishment of combustion in chamber 20 can be utilized effectively in maintaining the plunger 33 attracted to hold contact 34 in engagement with the contacts 36. To accomplish this in accordance with the present invention, the pickup winding 31 is maintained partially energized with unidirectional current through the current limiting resistor 39 when thermostat 22 closes its contacts so as to assist the holding winding 32 in maintaining the plunger 33 in the attracted position after the establishment of combustion in the chamber 20 during the initial cooling period of timing element 24. The pickup winding 31 is energized with unidirectional current through the agency of the rectifier 38 in order that the energizations provided by both the pickup winding 31 and the holding winding 32 may jointly and cumulatively magnetize the plunger 33 when power is supplied to the former from the alternating current supply lines L1, L2, and to the latter from the thermoelectric generator 37.

A control lockout timing device 40 is provided, and may be of the solder pot type, as shown, or any other suitable type that provides a relatively long timing period compared to the heating and cooling time of the periodic thermal timer 23. As shown, the lockout timer 40 is provided with a switch element 41 that is normally biased out of contact with the cooperating switch element 42 but is mechanically latched in contact therewith by engagement of element 41 with the teeth of the ratchet wheel 43. The shaft 44 carrying the ratchet wheel 43 is normally held stationary by the solder 45 in the pot 46 as long as the solder is solid. The electric heater 47 is provided for heating the pot 46 to soften the solder sufficiently to permit the ratchet wheel 43 to rotate and thereby permit switch member 41 to disengage the ratchet 43 in accordance with its bias and thereby move out of contact with switch element 42.

*Operation*

When thermostat 22 closes its contacts, the relay pickup winding 31 is partially energized through a circuit including conductor 50, contacts 41, 42, conductor 51, relay winding 31, conductor 57, heater 47, rectifier 38, and current limiting resistor 39. But at the same time a periodic heater energizing circuit is established from the alternating current supply line L2 through the thermostat 22, conductor 50, the solder pot switch members 41, 42, conductor 51, relay contacts 34, 35, conductor 52, periodic heater 28, contacts 26, the periodic thermal timer operating member 24, conductors 53 and 54, to the other alternating current supply line L1. In such periodic heater energizing circuit, the relay contacts 34, 35 and the thermal timer contacts 26 must both be closed to energize heater 28, thereby enabling the thermal timer 23 to provide a partial cooling time delay interval subsequent to the deenergization of the relay 30 and prior to the energization of heater 28 in the periodic time cycle. With periodic heater 28 thus energized, a limited heating period for the periodic timer operating element 24 is initiated. This timer heating period continues until the timing element 24 is heated sufficiently to overcome the attraction of the permanent magnet 25 that holds contacts 26 in engagement to extend the heating period and thereby predetermine the initial cooling period during which contacts 27 can be maintained closed by element 24. Thereupon the member 24 operates with a snap action to separate contact 26 and close the two contacts 27. The separation of contact 26 deenergizes the periodic heater 28 and thereby initiates the cooling of the thermal responsive operating element 24. However, both contacts 27 are maintained closed for only the initial limited period during the cooling of member 24 that is predetermined by the holding action of magnet 25 during the heating period.

The closing of the left-hand contact 27 short circuits the current limiting resistor 39 and thereby establishes an effective energization of the pickup winding 31 of the control relay 30, this pickup effective energizing circuit extending from line L2 through the contacts of thermostat 22, conductor 50, the contacts 41, 42 of the solder pot timer 40, conductor 51, pickup winding 31, conductor 57, the solder pot heater 47, rectifier 38, periodic timer contacts 27, conductors 53 and 54 to the other line L1. Upon the resulting effective energization of pickup winding 31, plunger 33 is picked up and moves contact 34 out of engagement with contact 35 and into engagement with contacts 36. The engagement of contact 34 with contacts 36 establishes an energizing circuit for the operating winding 11 of the oil burner operating motor, this burner operating circuit extending from line L2 through the contacts of the thermostat 22, the contacts of the solder pot relay 40, conductor 51, contacts 34, 35, conductor 60, the motor winding 11, and thence through conductors 58 and 54 to the other supply line L1. The oil valve 16 is simultaneously energized in parallel circuit with the motor winding 11.

Likewise, the primary winding of the ignition transformer 18 is energized in parallel circuit with the motor winding 11 through the right-hand contact 27 of the periodic thermal timer 23 during the initial limited cooling period of the timing element 24.

Thus the motor 11 starts operation of both the blower 12 and the oil pump 13 to discharge a combustible oil and air mixture from the burner nozzle 15. At the same time, transformer 18 establishes an arc between the electrodes 19 to ignite the mixture. Under these conditions, combustion should normally be established in the chamber 20 within the limited period provided by the cooling of the thermal timing element 24 prior to the opening of contacts 27.

Assuming that combustion is successfully established, thermoelectric generator 37 will become heated in response to the establishment of combustion, and thereupon supply a unidirectional energizing current to the relay holding winding 32. Consequently, before the timing member 24 has cooled sufficiently to begin the return movement to its biased position in which it is shown and thereby open both contacts 27, the unidirectional energization of holding winding 32 normally becomes effective to assist the continued partial unidirectional energization of the pickup winding 31 provided under the control of thermostat 22 by means of the energization limiting resistor 39. The joint magnetizing action of holding winding 32 and the partial energization of pickup winding 31 is required to hold plunger 33 in its attracted position and thereby maintain contact 34 in engagement with contact 36 independently of the control of timer 23 during and after the subsequent part of the cooling period thereof. In this way, the oil burner operating motor 11 is maintained in operation to continue combustion in the furnace chamber 20 under the joint control of both the thermal electric generator 37 and the master thermostat 22 and also responsive to voltage failure of the supply lines L1, L2.

In case for any reason combustion should fail, the output of thermoelectric generator 37 will quickly decrease so that holding winding 32 is no longer effectively energized. Under this condition the partial energization of pickup winding 31 alone is not sufficient to magnetically hold the plunger 33 in the attracted position. Hence the control relay 30 will respond to open the energizing circuit of the burner operating motor 11 and thereby prevent continued supply of the combustible mixture to the combustion chamber when combustion fails while the thermostat 22 is calling for operation of the burner.

If at any time during successful operation of the burner either the thermostat 22 becomes satisfied and opens its contacts or the alternating current voltage fails, then the partial energization of the pickup winding 31 is removed. In each case, the energization of holding winding 32 by the thermoelectric generator 37 alone is insufficient to maintain the contact 34 in engagement with contact 36 against the bias thereof to the opposite position. Consequently, when thermostat 22 opens its contacts, or the alternating current voltage fails, relay 30 will disengage contact 34 from contact 36 and thereby deenergize the burner operating motor 11 to stop combustion.

When thermostat 22 again closes its contact, the timer 23 again operates after a heating period to close its contacts 27, thereby short circuiting the current limiting resistor 39 to effectively energize the pickup winding 31 of relay 30 and start operation of the burner 10. Now let us assume that for some unknown reason combustion is not successfully established within the ensuing initial part of the cooling period of the thermal timer 23. In this case, the periodic timing member 24 will, after the initial cooling period, disengage contact 27 and thus terminate the effective energization of the relay pickup winding 31. Relay 30 at once responds in accordance with its bias to reclose contacts 35, and at the end of the subsequent cooling period of the timer 33 contacts 26 will be reclosed to again establish the energizing circuit for the timer heater 28. Thereupon heater 28 again heats the periodic timing element 24 for the heating period required to effect snap action thereof to disengage contacts 26 and re-engage contacts 27. Again the pickup winding 31 of relay 30 becomes effectively energized while heater 28 is deenergized to provide another limited initial cooling period of the member 24. During this initial cooling period burner 10 is again operated to attempt to establish combustion. In case combustion still is not successfully established, the periodic timer 23, after the subsequent cooling period is completed, may repeat the alternate energization of heater 28 during the heating time of element 24 and the effective energization of pickup winding 31 during the initial cooling time of element 24. During each subsequent cooling time delay period both heater 28 and winding 31 are maintained deenergized by the timing element 24. This enables the subsequent part of the cooling period, as well as the entire heating period of the thermal timer, to be utilized for timing the interval between the successive attempts to establish combustion. However, during each alternate effective energization of the pickup winding 31, the lockout heater 47 also is effectively energized to supply heat to the solder pot 46. After a limited number of repeated energizations of the lockout heater 47, sufficient heat will be accumulated by the solder pot 46 to soften the solder therein and permit the ratchet wheel 43 to turn and thereby disengage the lockout switch member 41 from the stationary contact 42. This serves to stop all further operation of the burner control system until the solder pot has cooled and switch member 41 has been manually reset. In this way the improved control system of the present invention provides repeated attempts to establish combustion by operation of the periodic thermal timer 23 before the lockout thermal timer 40 will respond to lock out the control.

What I claim as new and desire to secure by Letters Patent of the United States is:

1. In combination, a pair of heaters, energizing circuit means including a selective electroresponsive control device therefor having means biased for energizing one of said heaters while said device is energized below a predetermined value and operable to energize the other of said heaters while said device is energized above said value, a snap action thermal time switching element heated by said one heater and connected for deenergizing said one heater after a heating time delay and temporarily energizing said device above said value during the initial part of the ensuing cooling time delay, and means responsive to an operating condition of the other of said heaters for maintaining said device energized above said value independently of said time switching element during and after the subsequent part of said cooling time delay to maintain said other heater energized.

2. In combination, an electric heater, a combustion heater, energizing circuit means for alternately operating said heaters including a snap action thermal time delay switching element heated by said electric heater and connected for deenergizing said electric heater after a heating time delay and having electrical means temporarily controlled thereby during the initial part of the ensuing cooling time delay period for operating said combustion heater, and means responsive to an operating condition of said combustion heater for controlling said electrical means to continue operation of said combustion heater during the subsequent part of said cooling time delay period and after said cooling period.

3. In combination, an electrically operated combustion heater and a pair of electric heaters having energizing circuit means, sequential energization control means therefor including a snap action thermal time delay switching element heated by one of said electric heaters and having electrical means controlled thereby for alternately deenergizing said one heater after a heating time delay and temporarily energizing said combustion heater and the other of said electric heaters during the initial part of the ensuing cooling time delay and maintaining said pair of electric heaters deenergized during the subsequent part of said cooling time delay, means responsive to an operating condition of said combustion heater for controlling said electrical means to maintain said combustion heater energized independently of said time delay element, and thermal means cumulatively responsive to predetermined repeated energizations of said third heater for terminating the repeated sequential energization of said three heaters in the continued absence of said condition.

4. In combination, three heaters having energizing circuit means, a master control switch therefor having an electroresponsive control transfer device interconnected therewith for alternately energizing a pair of said heaters, a snap action thermal time delay switching element heated by one of said pair of heaters and interconnected for alternately deenergizing said one heater after a heating time delay and temporarily effectively energizing said device and the third one of said heaters only during the initial part of the ensuing cooling time delay and maintaining said first and third heaters effectively deenergized during the subsequent part of said cooling time delay, means responsive to an operating condition of the other of said pair of heaters for maintaining said control transfer device effectively energized independently of said time delay switching element, and control lockout means responsive to a predetermined repeated energization of said third heater during the initial part of successive cooling time delays for terminating further energization of said heaters and said device under control of said master switch in the continued absence of said condition.

5. In a control system, an electroresponsive control device, energizing control means therefor including a thermal time delay control element having a heater under the joint control of said device and said element for operating said element to deenergize said heater and thereupon temporarily energize said device only during an initial part of the cooling period of said time delay element, and automatic means including a burner having a flame responsive means rendered effective under the control of said device during said temporary energization thereof for maintaining said control device energized during and after the subsequent part of said cooling period.

6. In a control system, an electroresponsive control device having energizing circuit means, energization control means therefor including means for limiting the energization of said device, a heating and cooling time control element having a heater under the joint control of said device and said element for operating said element to temporarily energize said heater to heat said element only while said energization limiting means is effective and to temporarily render said energization limiting means ineffective only during the ensuing cooling period of said element, and separate energizing means rendered effective under the control of said device during said cooling period for supplementing the limited energization of said control device after said cooling period and thereby maintaining said device energized under the joint control of said energization control means and said separate energizing means.

7. In a control system, an electroresponsive device having a control member biased to one control position and operable to another control position upon a predetermined energization of said device, energizing circuit means for partially energizing said device, a snap action thermal time delay switching element connected for temporarily effecting said predetermined energization of said device during the cooling of said element, an electric heater for said element having an energizing circuit controlled jointly by said control member and said switching element to energize said heater to heat said element only while said control device is partially energized, said element having means for deenergizing said heater upon a predetermined heating of said element, and automatic energizing means rendered effective during said temporary predetermined energization of said control device for supplementing said partial energization of said device to maintain said control member in said other control position under the joint control of said partial energizing means and said automatic energizing means.

8. In a control system, an electroresponsive control device having two complementary energizing windings provided with energizing circuits, energizing control means therefor responsive to one condition and including means for limiting the energization of one of said windings, a snap action thermal time delay switching element connected for temporarily rendering said limiting means ineffective during the cooling of said element, an electric heater for said element having an energizing circuit controlled jointly by said control device and said element to energize said heater only while said limiting means is effective, said element having means for deenergizing said heater upon a predetermined heating of said element, and means responsive to the occurrence of a second predetermined condition during said cooling period for energizing the other of said windings to maintain said device energized under the joint control of both said condition responsive means.

9. In a control system, energizing circuit means including an electroresponsive control device having complementary energizing windings, energizing control means for one of said windings including a unidirectional current supply means having means for limiting the current supplied thereby, a thermal timing element having a heater energized under the control of said element for operating said element to deenergize said heater upon a predetermined heating of said element and temporarily render said current limiting means ineffective only during the initial part of the cooling period of said timing element, and temperature responsive unidirectional energizing means normally rendered effective during said temporary energization of said device for maintaining the other of said complementary windings energized during and after the subsequent part of said cooling period.

10. In a control system, energizing circuit means including an electroresponsive device having complementary energizing windings, energizing control means for one of said windings including unidirectional current supply means having means for limiting the current supplied thereby, a thermal time delay switching element having an electric heater energized under the joint control of said device and said element for operating said element to render said current limiting means ineffective only during the initial part of the cooling period of said element, said element having means for deenergizing said heater upon a predetermined heating of said element, and thermoelectric generating means having a combustion heater started into operation under the control of said device during said temporary energization of said one winding for maintaining the other of said complementary windings energized to continue operation of said combustion heater during the subsequent part of said cooling period and after said cooling period.

11. In a control system, energizing circuit means including an electroresponsive control device having complementary energizing windings, energizing means for one of said windings including a rectifier having means for limiting the current rectified thereby, a thermal timing element having an electric heater provided with an energizing circuit under the control of said element for periodically operating said element to render said current limiting means ineffective temporarily during the initial part of each cooling period of said element, said element having means for deenergizing said heater upon a predetermined heating of said element, and a thermoelectric generator having a combustion heater operated under control of said device during each temporary energization thereof by said rectifier for maintaining the other of said complementary windings energized to continue operation of said combustion heater when combustion is established during the initial part of one of said cooling periods.

12. In a control system, energizing circuit means including a switching device having an operating electromagnet provided with complementary energizing windings, unidirectional energizing control means for one of said windings including a rectifier and an energization limiting means, a thermal time delay switching element having an electric heater energized under the control of said element for operating said element to render said limiting means ineffective only during the initial part of the cooling period of said element, said element having means for deenergizing said heater upon a predetermined heating of said element, and a thermoelectric generator having a combustion heater operated under the control of said switching device during said initial part of said cooling period for maintaining the other winding of said electromagnet energized with unidirectional current to continue operation of said combustion heater during the subsequent part of said cooling period and after said period.

13. In combination with energizing circuit means, a combustion heater having an alternating current driving motor and igniter, a pair of electric heaters, a master switch having an electroresponsive relay controlled thereby and connected for alternately energizing said combustion heater driving motor and one of said pair of electric heaters, a snap action time delay switching element heated by said one electric heater and having a normally closed movable contact for deenergizing said one electric heater after a heating time delay and a pair of normally open movable contacts, one having a rectifier interconnected therewith for jointly energizing said relay and the other of said electric heaters with unidirectional current and the other for energizing said igniter to start operation of said combustion heater during the initial part of the ensuing cooling time delay period of said switching element, a thermoelectric generator heated upon establishment of combustion by said combustion heater during said initial part of said period for maintaining said relay energized during the subsequent part of said period and after said period and automatic lockout means cumulatively responsive to a predetermined repeated energization of said other electric heater for preventing further energization of said heaters and said relay under control of said master switch in the continued absence of combustion by said combustion heater.

14. A control system having, in combination, an electroresponsive control device having energization limiting means and cumulative energizing means for separately controlling operation thereof, an electric heater having energizing circuit means under the control of said device, circuit means including a thermal timing control element heated by said heater and having snap action means for holding said element in one position to produce snap action movement of said element from said one position to deenergize said heater and to another position for rendering said energization limiting means ineffective and thereby effect a temporary operation of said device only during the initial cooling of said element, condition producing means normally rendered effective upon operation of said device, and condition responsive means for rendering said cumulative energizing means effective to operate said device to maintain said condition producing means effective during and after the subsequent cooling of said element.

15. A control system having in combination a movable control member, means biasing said member to move from one control position to another control position, a pair of electromagnetic means for jointly holding said member in said one position upon a predetermined energization of each of said means, circuit means including a condition responsive device for providing said predetermined energization of one of said electromagnetic means, circuit means including a condition responsive device normally rendered effective upon operation of said control member to said one position for providing said predetermined energization of the other of said electromagnetic means, and circuit means including a snap action thermal timing device having an electric heater energized upon said predetermined energization of said one electromagnetic means under the joint control of said timing device and said control member in said other position for operating said timing device to deenergize said heater and provide a temporarily increased energization of said one electromagnetic means to operate said control member from said one control position to said other control position during the cooling of said timing device.

16. A control system having in combination an electroresponsive control device having a control member biased to move to a predetermined position upon only a partial energization of said device and having energizing circuit means including control means for partially energizing said device, circuit means including a thermal timing element for temporarily providing additional energization of said device to move said control member to another position while said element is cooling, a heater for said element having energizing circuit means energized only when said device is partially energized and said element is cool, said element having means for deenergizing said heater after said element is heated to a predetermined temperature, and means including condition responsive means normally rendered effective during said temporary additional energization of said device for maintaining a subsequent additional energization of said device to maintain said member in said other position under the joint control of said control means and said condition responsive means.

17. A control system having in combination alternating current circuit means including an electroresponsive switching device biased to a predetermined position, circuit means including a rectifier and a snap action thermal responsive switching element movable upon a predetermined heating thereof for temporarily providing a predetermined direct current energization of said device to effect operation thereof to another position only during the initial part of the interval said element is cooling, a heater for said element having energizing circuit means energized under the control of said device in said predetermined position and deenergized upon said predetermined heating of said element, and means including thermoelectric generating means normally rendered effective upon said temporary predetermined direct current energization of said device for providing a cumulative direct current energization of said device to maintain said device in said other position during and after the subsequent part of said interval.

18. A sequential condition timing control system having, in combination, an electroresponsive control device having energizing circuit means including a first condition responsive energization control means for ineffectively energizing said device and a thermal timing energization control element biased when heated to move from one control position to another control position for effectively energizing said device, snap action means for holding said element in said one position until after a predetermined heating of said element, an electric heater having a circuit energized under the joint control of said device when ineffectively energized and said element in said one position for biasing said control element for snap action movement from said one position to deenergize said heater and to said other position for temporarily effectively energizing said device during the initial part of the cooling time interval of said element predetermined by said holding means, said element having circuit controlling means for maintaining both said heater deenergized and said device ineffectively energized during the subsequent part of said cooling time interval of said element, condition producing means for normally establishing a second condition under the control of said device upon effective energization thereof, and circuit means including a second condition responsive means for maintaining said device effectively energized jointly with said first condition responsive energization control means upon the continuance of said second condition during and after said subsequent part of said cooling time interval of said element.

19. A sequential condition timing control system having, in combination, an electroresponsive control device having energizing circuit means including a first condition responsive energization control means for ineffectively energizing said device and energization control element for temporarily effectively energizing said device during the initial cooling of said element and providing a subsequent cooling time delay thereafter, a heater for said element having a circuit energized under the joint control of said device and said timing control element only when said device is ineffectively energized and said element is cool whereby said heater is maintained deenergized during said subsequent cooling time delay of said element independently of the control of said control device, condition producing means for normally establishing a second condition upon effective energization of said device, and circuit means including a second condition responsive means for maintaining said device effectively energized jointly with said first condition responsive means during said subsequent cooling time delay and thereafter to maintain said condition producing means effective and said heater deenergized independently of the control of said timing element.

20. In combination, an electric control device and an electric heater having interconnected selective energizing circuit means including a thermal time delay double throw switch heated by said electric heater under the joint control of said device and switch and having a snap action means for holding said switch to extend the heating period thereof and thereby thermally bias said switch to deenergize said heater and temporarily effectively energize said control device during the initial part of the cooling time delay interval of said switch, condition producing means normally rendered effective under control of said device upon said effective energization thereof, and condition responsive means having connections for maintaining said device effectively energized upon continued effective operation of said condition producing means during and after the subsequent part of said cooling time delay intervals.

BENJAMIN W. JONES.